(12) United States Patent
Giesfeldt et al.

(10) Patent No.: US 6,287,412 B1
(45) Date of Patent: Sep. 11, 2001

(54) HIGH SPEED CORRUGATING ADHESIVE INCORPORATING SOLUBILIZED CELLULOSIC FIBER

(75) Inventors: J. E. Todd Giesfeldt, La Grange; Larry E. Fitt, Orland Park; James J. Pienkowski, Oak Forest; Jack R. Wallace, Bolingbrook, all of IL (US)

(73) Assignee: CPC International, Inc., Englewood Cliffs, NJ (US)

( * ) Notice: Subject to any disclaimer, the term of this patent is extended or adjusted under 35 U.S.C. 154(b) by 0 days.

(21) Appl. No.: 08/227,821

(22) Filed: Apr. 14, 1994

Related U.S. Application Data

(63) Continuation-in-part of application No. 08/010,247, filed on Jan. 28, 1993, now Pat. No. 5,358,559, and a continuation-in-part of application No. 08/209,507, filed on Mar. 9, 1994.

(51) Int. Cl.$^7$ .................................. C09J 101/00
(52) U.S. Cl. .................... 156/336; 106/203; 106/213; 156/205; 156/328
(58) Field of Search ...................... 156/205, 336, 156/328; 106/203, 213

(56) References Cited

U.S. PATENT DOCUMENTS

| | | | |
|---|---|---|---|
| 2,772,981 | * 12/1956 | Smart | 106/203 |
| 4,941,922 | * 7/1990 | Snyder | 106/214 |
| 4,994,115 | 2/1991 | Giesfeldt et al. | 127/67 |
| 5,073,201 | 12/1991 | Giesfeldt et al. | 127/67 |
| 5,093,393 | * 3/1992 | Faber et al. | 156/328 |

FOREIGN PATENT DOCUMENTS

| | | | |
|---|---|---|---|
| 618584 | * 2/1949 | (GB) | 106/203 |

OTHER PUBLICATIONS

R. G. Whistler et al., Starch: Chemistry and Technology, 2nd edition, chapter xx, pp. 596–607, Academic Press, Inc., New York, 1984.
TAPPI Test Methods 1989, TAPPI, Atlanta, GA.

* cited by examiner

*Primary Examiner*—John J. Gallagher
(74) *Attorney, Agent, or Firm*—Norris, McLaughlin & Marcus

(57) ABSTRACT

Corrugating adhesives of the carrier, no-carrier and carrier-no-carrier type having excellent dry pin adhesion, green strength and improved water resistance are prepared with solubilized fiber as a complete or partial substitute for starch. The adhesive composition contains solubilized fiber and, optionally, from about 0.1% to about 99% added starch by weight based on total solubilized fiber and added starch. When the adhesive is the carrier type or the carrier-no-carrier type, the fiber, preferably corn fiber, can be solubilized in situ during the process of preparing the carrier phase.

8 Claims, No Drawings

HIGH SPEED CORRUGATING ADHESIVE INCORPORATING SOLUBILIZED CELLULOSIC FIBER

CROSS-REFERENCE TO RELATED APPLICATIONS

This application is a continuation-in-part of applications Ser. No. 08/010,247, filed Jan. 28, 1993, now U.S. Pat. No. 5,358,559, and Ser. No. 08/209,507, filed Mar. 9, 1994.

BACKGROUND OF THE INVENTION

1. Field of the Invention

The present invention relates to corrugating adhesives which contain solubilized plant fiber, such as corn fiber. More particularly, the invention relates to high speed corrugating adhesives of the carrier, no-carrier or carrier-no-carrier type which are prepared by incorporating solubilized corn fiber in the adhesive formulation to obtain excellent pin adhesion and improved water resistance.

2. Description of Related Art

Adhesives used in manufacturing corrugated board are usually comprised of starch, caustic, a boron containing compound and, where water resistance is needed, a waterproofing resin. The main binder of corrugating paper is the starch which is gelatinized in the corrugating process as it penetrates the paper fiber. The other components, namely, the caustic, boron containing compound, and waterproofing resin are auxiliary agents which modify the basic properties of the starch.

Caustic, usually in the form of sodium hydroxide, directly affects the gelatinization point temperature of the starch. Gelatinization point temperature is often referred to as gel point or gel temperature and is reduced from its natural value of 165° F. (74° C.) for unmodified corn starch to a temperature in the range from about 138° F. (59° C.) to about 160° F. (71° C.) by the addition of caustic. Caustic also enhances penetration of the gelatinized starch into the surface paper fibers allowing for better bonding.

The boron containing compounds perform multiple tasks. The most important function is developing the adhesive tackiness that is crucial in the formation of the "green bond". The green bond is the bond which holds the components of the corrugated board together until final heat curing of the adhesive system. It relies solely on the viscosity of the adhesive to maintain the integrity of the product during curing. Corrugating machine speeds therefore are limited by the rate of viscosity increase (i.e., rate of green bond formation) in the bond line between the liner and the corrugated medium. The oxygen atoms attached to the boron form stronger bonds, sometimes called boron bridges, between the starch and cellulose hydroxyl groups. Boron containing compounds also act as buffering agents in the presence of caustic and help maintain the viscosity stability of the adhesive paste.

It is known that polyhydroxy compounds other than starch, such as polyvinyl alcohol, will respond with the boron containing compounds in a manner similar to that with starch. Boron containing compounds and polyvinyl alcohol are believed to interact synergistically to form strong bonds. Like other polyhydroxy compounds, polyvinyl alcohol in the presence of starch will develop adhesive tackiness faster in the presence of boron, which means that the corrugator can operate at higher machine speeds.

Water proof or water resistant resins are considered to be an optional component of adhesives, and although some corrugating plants may not need them, most plants are prepared to use them when needed. Many types of thermosetting resins are suitable. The most common of them are derived from urea-formaldehyde, ketone-formaldehyde or melamine-formaldehyde. When heat and pressure is applied to them in a corrugating machine, they will condense to form an excellent water resistant network. When polyvinyl alcohol is added to adhesives containing these resins, it participates in cross-linking which will improve the water resistant bonds.

In the corrugating process, adhesive is commonly applied to the tips of the flutes of a corrugated medium. Then a noncorrugated flat paper liner is applied against the adhesive coated flutes as they pass between a corrugating roll and a pressure roll. The resulting product has the corrugating medium on one side and a flat liner on the other side and is called a single-faced portion. The single-faced portion may be used "as is" (called a "single facer" board) or adhesive may be applied to the flute tips of the single-faced portion and a second flat sheet can be applied in the same manner as the first in what is called a "double-facer" or a "double-backer" operation. The second liner sheet is treated with heat and reduced pressure (relative to the pressure used to make a single-faced portion) immediately following contact with the adhesive.

Starch-based adhesives which can be of the carrier, no-carrier and carrier-no-carrier type are commonly used in processes for manufacturing corrugated paper board. In carrier type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch.

One of the most important properties of a corrugating adhesive is green strength. Green strength is the characteristic that holds the paper together until the full strength of an adhesive develops. The green strength contributed by conventional starch adhesives is fairly low, but the addition of substances like polyvinyl alcohol improve the property as noted above. Increased levels of green strength, sometimes called early tack, allow corrugating machine operators to increase the speed of their machines without sacrificing the quality of the product.

Synthetic polymers that affect green strength tend to be expensive and their prices follow the volatility of the petroleum market. These polymers also are perceived by the public as less desirable than natural products. Moreover, the use of such polymers can require additional processing steps which adds expense for the corrugator.

Another important property of corrugating adhesives is known as dry pin adhesion. This is a measure of bond strength and the percentage of paper failure versus adhesive failure.

According to U.S. Pat. No. 4,941,922, fibers can be added to starch-based corrugating adhesives to enhance adhesion and dispersion and yield improved adhesive characteristics including increased waterproofness, dry strength, viscosity and adhesiveness. The fibers disclosed generally are insoluble fibers which have certain mechanical properties in that they provide interlocking filaments. Suitable sources of fiber are described as cellulosic fiber including wood, paper, cotton and rayon; fibers of synthetic origin including Nylon, polyester, polypropylene, Lycra Spandex, Vyrene, Vinyon, Dynel, Saran, Creslan, acrylic, polyethylene, Teflon, tetrafluoroethylene, glass, Corlon and metallic fibers. Fibers generated during the wheat or corn milling processes are also said to be suitable. According to the patent, the fibers typically are suspended initially in the uncooked starch portion, suspended with the carrier portion, suspended prior to the carrier-no-carrier (or no-carrier) swell or added to the final adhesive mixture prior to storage or use. There is no experimental data in the patent, however, describing the use of fibers generated during the corn milling process and the patent does not disclose the extraction of hemicellulose from fibers of any kind. Furthermore, the fibers must be present in an amount from about 2.2 to about 22 pounds of fiber per 100 pounds of corrugating adhesive and they must be large, having a diameter of between about 0.0005 inches and about 0.02 inches and a length of between about 0.025 inches and 0.25 inches.

It has now been found that solubilized plant fiber, particularly corn fiber, a readily available component of corn kernels and hulls, and other plant materials, can be used to enhance dry pin adhesion in starch-based corrugating adhesives. The use of solubilized plant fibers also provides excellent green strength, particularly at low viscosities, which allows for a wider range of viscosities compared with adhesives based primarily on starch. The solubilized fiber can replace some or all of the added starch in typical adhesives and can reduce the cost of the adhesive.

It has also been found that flatter board can be produced with adhesives containing plant fibers. This is advantageous when the board is cut and printed. The board also has less fractured liners and cracked scores compared with board produced using adhesives without plant fiber.

In the present specification and claims, all parts and percentages are by weight unless otherwise specified, and the term "parts of adhesive" is used to refer to the total weight of adhesive, including water, starch and all chemicals. The term "parts of carrier phase" is used to refer to the total weight of the carrier phase, including water, starch and all chemicals. The terms "total starch" and "total carbohydrate" refer to the total cumulative weight of unmodified starch, modified starch and dextrin present, i.e. all of the carbohydrates.

SUMMARY OF THE INVENTION

The corrugating adhesive composition of the invention is a carrier, no-carrier or carrier-no-carrier corrugating adhesive which contains solubilized fiber and, optionally, from about 0.1% to about 99%, preferably from about 10% to about 95%, added carbohydrate by weight based on total solubilized fiber and carbohydrate. The fiber can be derived from various plant materials including wood and agricultural products, and a preferred source of fiber is corn. It is recognized by applicants that starch, protein and other impurities will be present with fiber which has not been completely purified, and in such cases the fiber will contain from about 4% to about 60% starch.

Solubilized fiber can be added to the primary or secondary mixer in the preparation of a carrier type corrugating adhesive or it can be added at any stage in the preparation of a no-carrier or a carrier-no-carrier corrugating adhesive. In the preferred embodiment, a fiber such as corn fiber is added to the primary mixer and solubilized in situ in the preparation of a carrier or carrier-no-carrier corrugating adhesive.

According to the preferred embodiment, the carrier type corrugating adhesive of the invention is made by the following process:

1. Water, corn fiber and, optionally, added carbohydrate, are mixed in a primary mixer and heated for at least about 1 minute and preferably from about 1 minute to about 25 minutes at a temperature of from about 115° F. (46° C.) to about 180° F. (82° C.), preferably from about 125° F. (52° C.) to about 145° F. (63° C.):
2. An aqueous solution of caustic is added to attain a pH from about 8 to about 14, preferably from about 12 to about 14, and mixing is continued for at least about 10 minutes and preferably from about 10 to about 40 minutes;
3. Additional water is added and mixing is continued for at least about 1 minute and preferably from about 1 to about 15 minutes, most preferably from about 5 to about 8 minutes, to make a carrier phase;
4. A secondary mixer is charged with water, heated to from about 70° F. (21° C.) to about 120° F. (49° C.), preferably from about 90° F. (32° C.) to about 105° F. (41° C.) and borax is added;
5. Solubilized fiber and, optionally, unmodified starch and/or modified starch and/or dextrin is added, and waterproof resin can be added as an option, to make a suspended phase and the contents are mixed for from about 3 to 25 minutes;
6. The contents of the primary mixer are gradually added to the secondary mixer with continuous mixing. This step typically is carried out over a period of about 5 to 20 minutes.

A single tank system works just as well as the two-part system described above.

The corn fiber which is added to the primary mixer can be any kind of corn fiber. Suitable fibers include crude fiber, typically described as feed, and more finished products such as dietary corn fiber which is made for human consumption. The insoluble residue of the solubilized fiber in the adhesive and/or in a carrier phase preferably has a particle size of less than about 0.005 inch, a geometric mean size of less than about 0.00005 inch and a median size of less than about 0.00005 inch.

DETAILED DESCRIPTION OF THE INVENTION

The corrugating adhesive of the invention is an aqueous emulsion which employs solubilized fiber essentially to replace some or all of the starch component. The fiber can be pre-solubilized with caustic at a pH from about 8 to about 14 and a temperature from about 80° F. (27° C.) to about 220° F. (104° C., under pressure using a jet cooker) before it is added to the adhesive mix, or it can be solubilized in situ when the conditions (pH and temperature) used to make the adhesive will cause solubilization. Higher pH levels generally will increase the rate of solubilization, as will higher temperatures.

There are various options for employing the soluble fiber in the manufacture of corrugating adhesives. In a carrier type adhesive, the starch component that would normally be employed in the carrier phase can be partially or completely replaced with fiber and the fiber then can be solubilized in situ in the presence of a conventional amount of caustic. The suspended phase can then have a conventional amount of starch or some of the starch can be replaced with fiber which has been pre-solubilized. In a no-carrier type adhesive, some or all of the starch component can be replaced with pre-solubilized fiber. Carrier-no-carrier type adhesives can be prepared by solubilizing fiber in situ or by adding pre-solubilized starch, or both. Variations on the foregoing should be apparent to those skilled in the art.

The corrugating adhesive of the invention is an aqueous emulsion which comprises water; from about 5 to about 35, preferably from about 15 to about 25, parts per 100 parts of adhesive of solubilized fiber and, optionally, an added carbohydrate component; and sufficient caustic to attain a pH from about 8 to about 14, preferably from about 12 to about 14. When an added carbohydrate component is used, it is present in an amount from about 0.1 to about 99%, preferably from about 10 to about 95% by weight of the total solubilized fiber and added carbohydrate component.

In the carrier type embodiment, the carrier phase comprises from about 2 to about 6 parts per 100 parts of adhesive of the solubilized fiber and/or added carbohydrate component and the remaining solubilized fiber and/or added carbohydrate component is in a suspended phase, provided that at least a portion of the suspended phase must include a carbohydrate component in order to have a carrier type system. When the adhesive is a no-carrier type adhesive, the solubilized fiber/added carbohydrate component is partially swollen to attain a viscosity from about 20 to about 40 seconds, preferably from about 25 to about 35 seconds, as determined by an orifice type viscometer, commonly known as a Stein Hall cup. Finally, in the carrier-no-carrier type embodiment from about 0.05 to about 0.10 parts of the solubilized fiber/added carbohydrate component (based on total solubilized fiber and added carbohydrate) is in a carrier phase and the remainder is partially swollen to attain a viscosity from about 30 to about 50 seconds, preferably from about 35 to about 45 seconds, determined in the same manner as for the no-carrier embodiment.

The adhesive of the invention can contain from about 0.2 to about 1 part per 100 parts of adhesive of a boron containing compound. A waterproofing or water resistant resin also can be incorporated in the adhesive in an amount from about 0.5 to about 5 parts per 100 parts of adhesive.

In a preferred embodiment, the adhesive is a carrier type or carrier-no-carrier type adhesive and the fiber is corn fiber which is solubilized in situ during preparation of the carrier phase.

The carrier type corrugating adhesive composition of the invention is made by separately preparing two intermediates and then combining them. One intermediate is called the carrier phase and the other is called the suspended phase.

The carrier phase is made by admixing the fiber and the optional added carbohydrate component with water. These components can be added to the water together or in any order. The combined amount of fiber and optional added carbohydrate component which is added is from about 10 to about 30 parts per 100 parts of carrier phase or from about 2 to about 6 parts per 100 parts of adhesive.

In the most preferred embodiment of the invention, the fiber is corn fiber which is employed in a carrier type adhesive. A suitable corn fiber is dietary corn fiber and it can be prepared according to U.S. Pat. Nos. 4,994,115 or 5,073,201. The corn fiber is admixed with the other ingredients in the preparation of the carrier phase. The components are continuously mixed and heated to a temperature from about 115° F. (46° C.) to about 180° F. (82° C.). Sufficient caustic is then added to provide an alkaline pH while continuing mixing and maintaining heating. Mixing and heating are continued for a sufficient time to solubilize the corn fiber in situ. The pH should exceed about 10 and preferably will exceed about 12. The sufficient time and temperature will generally be from about 10 to about 40 minutes at from about 115° F. (46° C.) to about 180° F. (82° C.). Lower temperatures generally correspond with longer times.

The preferred solubilized fiber of the invention has residual insoluble material having a particle size in the adhesive of less than about 0.005 inch, a geometric mean size of less than about 0.00005 inch and a median size of less than about 0.00005 inch.

Following the removal of heat, mixing can be continued to allow uniform cooling. Water can be added at this stage to speed cooling.

The suspended phase is made by admixing a carbohydrate component and, optionally, pre-solubilized fiber with heated water. The water is heated at a temperature from about 70° F. (21° C.) to about 105° F. (41° C.) and is mixed continuously. The carbohydrate component and optional pre-solubilized fiber is added in an amount from about 10 to about 30 parts per 100 parts of the corrugating adhesive, and preferably in an amount from about 15 to about 25 parts per 100 parts of the adhesive.

A boron containing compound such as boric acid or a boric acid salt must be added at some stage in the process to improve tack or stickiness. It may be added in the preparation of the carrier phase, the suspended phase, or in both phases. When a portion of the boron containing compound is added during the preparation of the carrier phase, it also improves the viscosity stability of the final adhesive product. Preferably, however, most of the boron containing compound is added to the suspended phase.

When the boron containing compound is added during the preparation of the carrier phase, it is added in an amount from about 0.03 to about 1 part per 100 parts of carrier phase or in an amount from about 0.01 to about 0.3 parts per 100 parts of adhesive. The boron containing compound added to the suspended starch phase is added in an amount to bring the total boron containing compound up to from about 0.2 to about 1 part per 100 parts of the adhesive.

The carrier phase is gradually added to a tank containing the suspended phase with continuous mixing of the contents of the tank. The temperature of the tank contents is maintained at from about 70° F. (21° C.) to about 120° F. (49° C.), preferably from about 90° F. (32° C.) to about 105° F. (41° C.), during the gradual addition. The amount of the carrier phase added is from about 15 to about 50 parts per 100 parts of adhesive.

A waterproofing or water resistant resin may be added to the suspended phase tank at any time in an amount from about 0.5 to about 5 parts per 100 parts of adhesive. It is preferable to add the resin following completion of all of the other adhesive preparation steps.

The individual components of the carrier type adhesive composition of the invention are described in detail below along with descriptions of their preferred embodiments.

Fiber

Corn fiber produced by the corn wet milling industry is suitable, especially dietary corn fiber which is sold under the designation PEERLESS® corn fiber by the Corn Products Unit of CPC International Inc., P.O. Box 8000, Englewood Cliffs, N. J. 07632 USA. Another preferred source of corn fiber is produced by the dry milling process, such as corn bran sold by Illinois Cereal Mills, 616 South Jefferson Avenue, Paris, Ill. 61944 as Code 97800 high fiber corn bran. (Dry millers may refer to corn fiber as corn bran. The terms corn fiber and corn bran are synonymous for purposes of this specification.) The corn fiber and/or bran must be ground to increase its surface area sufficiently to minimize the amount of residual insoluble material in the solubilized fiber and to allow the fiber to dissolve under relatively mild conditions. When the fiber is not ground to sufficient fineness, it dissolves poorly, particles float around in the preparation and a grainy adhesive is produced which plugs the hole in a Stein-Hall cup. Successful adhesives have been made when the fiber is sufficiently ground so that about 70% will pass through a -325 mesh screen (44 microns or 0.0017 inch).

Carrier Phase Carbohydrate

When a carbohydrate component is employed in the carrier phase, unmodified starch or dextrin can be used, but modified starch is preferred because it enables the dissolution of substantially more solids (up to twice the amount attainable with unmodified starch) in the adhesive composition and therefore contributes to the development of better pin adhesion and other adhesive characteristics. The reason is that modified starches, when pasted in water, are less viscous than their unmodified counterparts, and as a consequence they can "carry" more ungelatinized starch at practical viscosities.

The modified starch which is used in accordance with the present invention can be mechanically, chemically or heat modified. Compared to unmodified starches, modified starches improve paste stability compared with pearl starch and they frequently possess superior physical properties such as increased solubility, better film forming, increased whiteness, improved gel strength, viscosity stability, increased adhesivity, improved resistance to shear and increased resistance to freeze-thaw degradation. Starches derived from other genetic forms of corn, such as high amylose and waxy corn as well as sorghum varieties would also be suitable for such applications. Suitable chemically modified starches include modified oxidized starch such as hypochlorite-oxidized starch, acid-thinned starch, ethylated starch, cross-bonded starch and others which have reduced molecular weight, higher fluidity and/or functional sub groups.

Examples of chemically modified starches which can be used in the invention and are commercially available are SUREBOND® or STABLEBOND® modified starches which have residual carboxyl functionality and extreme uniformity and are sold by the Corn Products Unit of CPC International Inc., P.O. Box 8000, Englewood Cliffs, N.J. 07632 USA.

Unmodified starches which can be used in the carrier phase are the same as those described in more detail below in the discussion of the suspension phase starch.

The dextrins which can be used in the carrier phase are prepared by heating starch under various conditions as more fully described in Whistler, R. L. et al., *Starch: Chemistry and Technology*, 2nd edition, Chapter XX, pages 596–607, Academic Press, Inc. (New York, 1984).

Suspension Phase Carbohydrate

The preferred carbohydrate for the suspension phase is unmodified starch which is a commodity chemical produced from the root, stem or fruit from a number of plants. It is a high molecular weight carbohydrate polymer which is comprised of linear and branched polysaccharide polymers. Modified starch and/or dextrin can be used as the suspension phase starch, but unmodified starch is more economical.

Boron Containing Compound

Any boron containing compound having free hydroxyl groups attached to the boron atoms can be used. The most commonly used compounds are commercial boric acid (ortho boric acid, $H_3BO_3$ and its hydrated forms $H_3BO3.xH_2O$) and borax (sodium tetraborate decahydrate, $Na_2B_4O_7.10H_2O$ and other hydrate and anhydrous forms)

Caustic

Any strong base can be used, but the preferred bases are alkali metal hydroxides. The most preferred are sodium and potassium hydroxide.

Waterproofing/Water Resistance

Starch-based corrugating adhesives prepared with solubilized fiber have excellent waterproof characteristics compared with the same adhesive made without solubilized fiber. If more enhanced waterproofing or water resistance is desired, however, conventional resins which are employed in the corrugating industry can be used.

Preferred waterproofing or water resistant resins include those which upon heating in basic media generate cross-linking species which react and cross-link with any available hydroxyl group in the starch, polyvinyl alcohol, hemicellulose or cellulose molecules. The cross-linking action reduces the hydrophilic nature and water-solubility of the solubilized fiber, carbohydrate and other polyhydroxy molecules by effectively removing the availability of hydroxyl groups to water and by developing hydrophobic, aliphatic cross-linking moieties. Condensation products from the reaction of a ketone and an aldehyde compound are suitable. These resins are characterized as polyether polymers, but can contain a variety of other monomers such as urea, melamine, and the like. The most preferred resins are acetone-formaldehyde resins, acetone-urea-formaldehyde resins and acetone-melamine-formaldehyde resins comprising about 1.5–30% by weight acetone, about 5–50% by weight formaldehyde and about 0–15% of a third monomer. A commercially available cross-linking resin which is suitable for use in the present invention is the ASTROMEL® series of resins manufactured by Astro Industries, Inc., 114 Industrial Boulevard, P.O. Box 2559, Morganton, N.C. 28655 USA.

EXAMPLES

Corrugated board samples were made using a bench scale two-part Stein-Hall corrugating machine.

The adhesives were made with various kinds of fiber. Starches from two groups also were used, as follows:

1. Unmodified pearl starch that has a low fluidity (alkali fluidity approximately 1).

2. Modified carrier starch STABLEBOND® G551 having an alkali fluidity of approximately 10.

Alkali fluidity is a measure of starch-paste flowability in an alkaline medium. Therefore, the higher the alkali fluidity the greater the flowability of the starch-paste, or the thinner its consistency. That property allows the corrugator to add more starch or solids to the adhesive, which in turn means there will be better interaction with the paper fibers and other adhesive additives. The procedure for measuring alkali fluidity was as follows:

Weigh 5.00 grams of sample, transfer to a 300 milliliter glass beaker, add 10.0 milliliters of water at 25° C. and stir to a slurry with a glass rod. Place the beaker in a water bath at 25° C., add 90.0 milliliters of 1% (weight/volume) sodium hydroxide at 25° C. and start a stopwatch. Stir for 3 minutes at 200 rpm and let stand in the bath for a total of 32.5 minutes.

Rinse a fluidity funnel with 25° C. water and drain thoroughly. Place a finger under the tip of the funnel and pour the volume of prepared paste into the funnel while avoiding the introduction of air bubbles. Place a 100 milliliter graduated cylinder under the tip. At 33 minutes total elapsed time after the sodium hydroxide was added, remove the finger blocking the funnel tip and allow paste to flow into the cylinder for exactly 70 seconds and quickly remove the cylinder. Disperse any foam with a drop of amyl alcohol.

The alkali fluidity is the number of milliliters of paste collected in the cylinder per 70 seconds, corrected according to the starch calibration curve furnished with the funnel.

Example 1

Two fiber sources were used. The first was CELLACE water soluble fiber, a highly soluble, enzymatically purified fiber from Nihon Shokuhin Kako Company, Japan. This simulates pre-solubilized product a box plant would buy. The second material was the Illinois Cereal Mills corn bran Code 97800, referenced above.

There are three tables. Table I contains data showing a two tank (primary, secondary) Stein Hall system with CEL-LACE and Code 97800 added to about a 50% starch replacement. Table II shows single-tank mixes with CEL-LACE out to a 100% fiber adhesive. Table III shows a similar single tank mix with Code 97800 bran out to a 100% fiber (as is) adhesive.

CELLACE is produced by dissolving corn bran at high pH. The filtrate is purified, treated with enzyme to reduce molecular weight, and dried on a roll dryer. The resulting material has a high hemicellulose component and dissolves in warm water with a little agitation, forming a medium brown colored clear liquid with moderate viscosity at 20–25% solids.

The second fiber source, Illinois Cereal Mills Code 97800 corn bran, is not water soluble. It also produces a less pure soluble hemicellulose, because it is a soluble corn bran soup, composed of hemicellulose, water soluble lignin, starch, protein, and oil, along with some residual insoluble cellulose.

CELLACE Fiber Work

CELLACE soluble fiber performs the function of the carrier in the traditional Stein Hall system. However, there is no need to dissolve or extract the CELLACE fiber in a separate "primary" step. With the CELLACE material, most of the paste was made in the secondary mixer, in other words a single tank mix.

Some paste was made using carrier starch and/or insoluble Code 97800 corn bran in the primary and CEL-LACE water soluble fiber in the secondary. The carrier starch primary followed by a secondary starch/soluble fiber combination may offer some benefit in fine tuning the viscosity, and maybe provide for better paste stability with holding time.

Paste Preparation with CELLACE Soluble Fiber

The two-tank Stein Hall paste starts with the typical primary preparation with water heated to 130° F., starch and/or insoluble fiber added, mixed, then treated with caustic, and finally cooled with additional water. Water is added to the secondary tank and heated to 90° F. Then the pearl starch and/or CELLACE is added to the secondary, allowed to mix for 10 minutes; finally, borax is added and the contents of the primary tank are slowly added to the secondary tank with continuous mixing, finishing the paste.

The single tank mix simply follows the aforesaid primary preparation with the additional steps of adding water, starch and a final amount of Borax to the mix.

Corrugated Board Preparation

The paste was held for ½ to 2 hours at ambient temperature, before it was used to make the double-back bond on 2"×5" test sheets, completing the finished corrugated board. Paste was spread across a stainless steel plate using a spreading gauge set to 10 microns. The commercially supplied piece of single face was pressed into the adhesive spread across the plate. The liner, used to form the top of the finished board, was laid on top of the adhesive wetted flutes of the single-face before going into the laboratory equivalent of the heating plates of a commercial doublebacker.

A Carver press was used to produce the double-back bond. The press was equipped with top and bottom heating plates set to 310° F. The press was closed to allow the single face to just touch the liner without crushing the flutes. Zero pressure registered on the pressure gauge. Residence time in the press was 10 seconds. The board samples were allowed to cool on a cold flat surface after they were removed.

After the board samples were made, they were subjected to two-one-two Technical Association of Pulp and Paper Industry, Inc. (TAPPI) tests. Dry PIN Adhesion testing was carried out to determine bond strength and the percentage of paper versus adhesive failure. The test for Dry Pin Adhesion (TAPPI T821) for bond strength followed the test methods published in *TAPPI Test Methods* 1989, available from TAPPI, One Dunwoody Park, Atlanta, Ga. 30341 U.S.A.

Table I shows the formulas and results from adhesive made with a primary/secondary Stein Hall system using ground Code 97800 corn bran to replace half of the starch carrier in the primary and CELLACE water soluble fiber to replace half of the pearl starch in the secondary.

TABLE I

Primary/Secondary Single Viscosity Formulas

| Formula No. | 1 | 2 (Control) |
|---|---|---|
| Total % Fiber | 46 | 0 |
| Primary Mixer | | |
| Water, ml | 416 | 416 |
| Pearl Starch | — | — |
| G-551 STABLEBOND, g | 85 | 170 |
| Code 97800, g | 85 | — |
| Mix, min. | 5 | 5 |
| Caustic (50/50), g | 52 | 52 |
| Mix, min. | 20 | 20 |
| Water, ml | 375 | 375 |
| Mix, min. | 0 | 5 |
| Secondary Mixer | | |
| Water, ml | 2890 | 1665 |
| Pearl Starch, g | 324 | 649 |
| CELLACE, g | 324 | |
| Borax (10 mol), g | 24 | 24 |
| Finished Paste | | |
| Solids, % d.b. | 17.5 | 23.5 |
| Viscosity, sec | 191 | 168 |
| Gel point, ° F. | 158 | 142 |
| Test samples of board | | |
| Dry pin adhesion, lb/lin ft | 66 | 83 |
| Paper failure, % | 13 | 5 |
| Adhesive Failure, % | 87 | 95 |

Table II shows the formula and results using a single tank mix.

TABLE II

Single Tank Mix, Single Viscosity Formulas Using CELLACE Water Soluble Fiber

| Formula No. | 3 | 4 | 5 | 6 |
|---|---|---|---|---|
| % Water soluble fiber | 100 | 50 | 100 | 25 |
| Water, ml | 416 | 514 | 416 | 514 |
| G-551 STABLEBOND, g | — | 100 | — | 150 |
| CELLACE, g | 170 | 100 | 100 | 50 |
| Mix, min. | 10 | 10 | 10 | 10 |
| Caustic (50/50), g | 52 | 6 | — | 6 |
| Borax (10 Mol), g | 5 | 1 | — | 2 |
| Water, ml | 400 | — | — | — |
| Mix, min. | 20 | 20 | — | 20 |
| Finished Paste | | | | |
| Solids, % d.b. | 18.1 | 25.5 | 18.0 | 25.8 |
| Viscosity, sec | — | 58 | 85 | 37 |
| Gel point, °F. | none | 155 | none | 158 |
| Test samples of board | | | | |
| Dry pin adhesion, lb/lin ft (n = 3) | 60 | 77 | 63 | 76 |
| Paper failure, % | 3 | 25 | 1 | 30 |
| Adhesive Failure, % | 97 | 75 | 99 | 70 |

The third part of the work used dry ground Code 97800 bran. First, we had to solubilize the bran. This was easily done with caustic. However, as the fiber substitution increases beyond 20% based on total starch, the fiber no longer fit in the primary mixer.

We observed that the percent solids are on the low side. This is because the molecular weight of the dissolved fiber gives gum like high viscosity properties to the mix.

TABLE III

Single Tank Mix, Single Viscosity Formula Using Ground Illinois Cereal Code 97800 Bran

| Formula No. | 7 | 8 | 9 |
|---|---|---|---|
| % Fiber | 25 | 50 | 100 |
| Water, ml | 500 | 1000 | 250 |
| Code 97800, g | 50 | 100 | 50 |
| Caustic (50/50), g | 20 | 40 | 20 |
| Mix by hand | | | |
| Water, ml | 850 | 1100 | 150 |
| Pearl Starch, g | 150 | 100 | — |
| Borax, g | 1 | 1 | — |
| Mix, min | 10 | 20 | 10 |
| Finished adhesive | | | |
| Solids, % d.b. | 12.3 | 8.8 | 12.3 |
| Viscosity, sec | 39 | 88 | — |
| Gel point, °F. | 158 | none | none |
| Test Samples of Board | | | |
| Dry pin adhesion lb/lin ft | 75 | 30 | 42 |
| % paper failure | 7 | 0 | 1 |
| % adhesive failure | 93 | 100 | 99 |

Example 2

Adhesive data was generated for the different sources of fiber from corn, and other fiber sources, that we added to the primary part of the Stein-Hall paste system. We used the formula 2:1 g-551:fiber.

Just about all the sources of wet milled corn fiber are covered, along with oat and sugar beet fiber, three common food fibers.

Table IV shows the paste results.

TABLE IV

Primary/secondary single viscosity mix (G-551 carrier and 3005 pearl starch all runs)

| | Spent Germ | Corn Flour | CELLACE | Ground Corn | Press Cake[1] | Corn Cobbs |
|---|---|---|---|---|---|---|
| Composition[2] | | | | | | |
| % TDF, db | 55 | 7 | 98 | 17 | 55 | 98 |
| % Starch, db | 17 | 86 | 2.3 | 71 | 33 | 0 |
| % Wt. as is | | | | | | |
| +100 mesh | 17 | 20 | 24 | 71 | 87 | 86 |
| −100 + 200 mesh | 34 | 35 | 38 | 8 | 7 | 9 |
| −200 + 325 mesh | 16 | 15 | 20 | 16 | 4 | 3 |
| −325 mesh | 33 | 30 | 20 | 5 | 2 | 2 |
| Primary Mix | | | | | | |
| Water, ml | 416 | 416 | 416 | 416 | 416 | 416 |
| Heat, °F. | 130 | 130 | 130 | 130 | 130 | 130 |
| Fiber in Primary, g | 45 | 45 | 45 | 45 | 45 | 45 |
| G-551, g | 125 | 125 | 125 | 125 | 125 | 125 |
| Mix, min. | 5 | 5 | 5 | 5 | 5 | 5 |
| 50% Caustic, g | 52 | 52 | 52 | 52 | 52 | 52 |
| Mix, min. | 20 | 20 | 20 | 20 | 20 | 20 |
| Water, ml | 375 | 375 | 375 | 375 | 375 | 375 |
| Secondary mixer | | | | | | |
| Water, ml | 1665 | 1665 | 1665 | 1665 | 1665 | 1665 |
| Heat, °F. | 90 | 90 | 90 | 90 | 90 | 90 |
| Starch, g | 649 | 649 | 649 | 649 | 649 | 649 |
| Borax 10 mol, g | 24 | 24 | 24 | 24 | 24 | 24 |
| Finished paste | | | | | | |
| Viscosity, sec. | 23 | 165 | 25 | 21 | 28 | — |
| Gel point, °F. | 153 | 146 | 150 | 152 | 150 | 152 |

| | Oat Fiber | Sugar Beet Fiber | Argo Feed | Code 97800 | All Starch Control |
|---|---|---|---|---|---|
| Composition | | | | | |
| % TDF, db | 98 | 75 | 46 | 82 | 0 |
| % Starch, db | 1 | 16 | 24 | 13 | 100 |
| % Wt. as is | | | | | |
| +100 mesh | 4 | 0 | 88 | 0 | — |
| −100 + 200 mesh | 16 | 80 | 8 | 4 | — |
| −200 + 325 mesh | 37 | 19 | 1 | 25 | — |
| −325 mesh | 43 | 1 | 3 | 71 | — |
| Primary Mix | | | | | |
| Water, ml | 416 | 416 | 416 | 416 | 416 |
| Heat, °F. | 130 | 130 | 130 | 130 | 130 |
| Fiber in Primary, g | 45 | 45 | 45 | 45 | 45 |
| G-551, g | 125 | 125 | 125 | 125 | 125 |
| Mix, min. | 5 | 5 | 5 | 5 | 5 |
| 50% Caustic, g | 52 | 52 | 52 | 52 | 52 |
| Mix, min. | 20 | 20 | 20 | 20 | 20 |
| Water, ml | 375 | 375 | 375 | 375 | 375 |
| Secondary mixer | | | | | |
| Water, ml | 1665 | 1665 | 1665 | 1665 | 1665 |
| Heat, °F. | 90 | 90 | 90 | 90 | 90 |
| Starch, g | 649 | 649 | 649 | 649 | 649 |
| Borax 10 mol, g | 24 | 24 | 24 | 24 | 24 |

TABLE IV-continued

Primary/secondary single viscosity mix
(G-551 carrier and 3005 pearl starch all runs)

Finished paste

| | | | | | |
|---|---|---|---|---|---|
| Viscosity, sec. | 66 | 21 | 21 | 30 | ? |
| Gel point, °F. | 150 | 152 | 151 | 149 | ? |

[1]Andritz press cake
[2]The material was ground through a 0.23 millimeter screen in a Fitzmill laboratory grinder.

With the exception of the finished viscosity for the corn flour, the finished paste attributes of the different fiber sources are close to the Illinois Cereal Code 97800 corn bran at 45 g substitution.

In addition to the work with the different fiber sources, we also ran several tests with fiber up to 100% of the primary mix. This work was done with the Code 97800 bran, Andritz press cake, and the CELLACE product. The results are summarized in Table V.

TABLE V

Primary/secondary single viscosity formula
(G-551 carrier starch and 3005 starch)

| | Code 97800 Bran | | Andritz Press Cake | | CELLACE | |
|---|---|---|---|---|---|---|
| % Fiber in primary (as is) | 60 | 100 | 60 | 100 | 50 | 100 |
| % Fiber of total starch (as is) | 10.4 | 20.1 | 10.4 | 17.3 | 10.4 | 20.1 |
| Primary Mixer | | | | | | |
| Water, ml | 416 | 616 | 416 | 416 | 416 | 416 |
| Heat, °F. | 130 | 130 | 130 | 130 | 130 | 130 |
| G-551, g | 85 | 0 | 85 | 0 | 85 | 0 |
| % Fiber, g | 85 | 170 | 85 | 136[1] | 85 | 170 |
| Mix, min. | 5 | 5 | 5 | 5 | 5 | 5 |
| 50% caustic, g | 52 | 52 | 52 | 52 | 25 | 52 |
| Mix, min. | 20 | 20 | 20 | 20 | 20 | 20 |
| Water, ml | 375 | 500 | 375 | 375 | 375 | 375 |
| Secondary mixer | | | | | | |
| Water, ml | 1665 | 1665 | 1665 | 1665 | 1665 | 1665 |
| Starch, g | 649 | 649 | 649 | 649 | 649 | 649 |
| Borax 10 mol, g | 24 | 24 | 24 | 24 | 24 | 24 |
| Finished paste | | | | | | |
| % Solids, d.b. | 21 | 17.9 | 21 | 19.4 | 21.4 | 19.2 |
| Viscosity, sec. | 31 | 45 | 73 | 21 | 25 | 16[2] |
| Gel point, °F. | 157 | 152 | 152 | 155 | 146 | 159 |

[1]Could not get more than 136 g APC in the primary mixer.
[2]No explanation why the finish viscosity is so low.

Example 3

Following dissolution, the various kinds of fiber used in accordance with the invention have a certain amount of residual insoluble material. While the mechanism is not known, applicants believe that this material contributes to the improved properties of the adhesives of the invention. Accordingly, we have measured the particle sizes of this material.

The term "size" rather than terms such as "diameter" and "length" have been used to describe the residual insoluble material (referred to herein as "particles") present in the carrier phase or the adhesives of the present invention because of the limitations on the analytical techniques which are available to measure the sizes of microscopic particles which are dispersed in a liquid. When the particles are viewed with microscopic magnification, they generally appear to be rhombohedral in shape and/or platelet shaped, the length of the fibers being approximately equal to the width. The term "size" therefore refers both to length and width.

In order to measure the size of the particles in the adhesive or carrier phase compositions of the invention, ground corn fiber was treated with caustic under the same conditions as is used to solubilize ground corn fiber in situ when preparing the carrier phase in accordance with the invention and then the particle size was measured by Particle Data Laboratories, Ltd., 238 North York, Elmhurst, Ill. 60126 U.S.A., using an ELZONE™ particle size analyzer. Particle volumes were measured and size was determined by assuming the volumes were for sperical particles and the size (i.e. the diameter) was calculated based on the formula for determining diameter based on the known volume of a sphere. All sizes are expressed in microns.

The data generated is set forth in Table VI.

TABLE VI

| Chnl | Size | Volume | Cuml % |
|---|---|---|---|
| 4 | 0.548 | 0 | 100.0 |
| 5 | 0.574 | 2.84E7 | 99.9 |
| 6 | 0.60 | 3.07E7 | 99.7 |
| 7 | 0.629 | 3.31E7 | 99.5 |
| 8 | 0.659 | 3.61E7 | 99.3 |
| 9 | 0.690 | 3.84E7 | 99.0 |
| 10 | 0.722 | 4.01E7 | 98.8 |
| 11 | 0.76 | 4.13E7 | 96.5 |
| 12 | 0.792 | 4.27E7 | 98.3 |
| 13 | 0.829 | 4.30E7 | 96.0 |
| 14 | 0.868 | 4.57E7 | 97.7 |
| 15 | 0.909 | 4.76E7 | 97.4 |
| 16 | 0.95 | 4.96E7 | 97.1 |
| 17 | 0.997 | 5.36E7 | 97.7 |
| 18 | 1.044 | 5.78E7 | 96.4 |
| 19 | 1.093 | 6.03E7 | 96.0 |
| 20 | 1.145 | 6.22E7 | 95.6 |
| 21 | 1.2 | 6.56E7 | 95.2 |
| 22 | 1.255 | 7.00E7 | 94.8 |
| 23 | 1.314 | 7.35E7 | 94.3 |
| 24 | 1.376 | 7.66E7 | 93.8 |
| 25 | 1.441 | 7.94E7 | 93.3 |
| 26 | 1.5 | 8.28E7 | 92.8 |
| 27 | 1.580 | 8.45E7 | 92.2 |
| 28 | 1.655 | 8.52E7 | 91.7 |
| 29 | 1.733 | 8.67E7 | 91.1 |
| 30 | 1.814 | 9.12E7 | 90.6 |
| 31 | 1.9 | 9.12E7 | 90.0 |
| 32 | 1.990 | 9.00E7 | 89.4 |
| 33 | 2.083 | 9.53E7 | 88.8 |
| 34 | 2.181 | 8.52E7 | 88.2 |
| 35 | 2.284 | 8.76E7 | 87.6 |
| 36 | 2.4 | 9.06E7 | 87.1 |
| 37 | 2.505 | 9.15E7 | 86.5 |
| 38 | 2.623 | 9.29E7 | 85.9 |
| 39 | 2.746 | 9.08E7 | 85.3 |
| 40 | 2.876 | 8.47E7 | 84.7 |
| 41 | 3.0 | 7.84E7 | 84.2 |
| 42 | 3.153 | 7.22E7 | 83.7 |
| 43 | 3.302 | 6.77E7 | 83.3 |
| 44 | 3.457 | 6.37E7 | 82.8 |
| 45 | 3.620 | 6.09E7 | 82.4 |
| 46 | 3.8 | 5.89E7 | 82.0 |
| 47 | 3.970 | 5.85E7 | 81.7 |
| 48 | 4.157 | 6.01E7 | 81.3 |
| 59 | 4.353 | 6.20E7 | 80.9 |
| 50 | 4.558 | 6.42E7 | 80.5 |
| 51 | 4.8 | 6.64E7 | 80.0 |
| 52 | 4.998 | 6.74E7 | 79.6 |
| 53 | 5.233 | 6.97E7 | 79.2 |

TABLE VI-continued

| Chnl | Size | Volume | Cuml % |
|---|---|---|---|
| 54 | 5.480 | 7.33E7 | 78.7 |
| 55 | 5.738 | 7.65E7 | 78.2 |
| 56 | 6.0 | 8.18E7 | 77.7 |
| 67 | 6.291 | 8.33E7 | 77.2 |
| 58 | 6.588 | 8.39E7 | 76.6 |
| 69 | 6.898 | 8.81E7 | 76.1 |
| 60 | 7.224 | 9.42E7 | 75.5 |
| 61 | 7.6 | 9.82E7 | 74.9 |
| 62 | 7.921 | 1.02E8 | 74.2 |
| 63 | 8.294 | 1.09E8 | 73.5 |
| 64 | 8.685 | 1.16E8 | 72.8 |
| 65 | 9.094 | 1.21E8 | 72.1 |
| 66 | 9.5 | 1.30E8 | 71.2 |
| 67 | 9.971 | 1.37E8 | 70.4 |
| 68 | 10.44 | 1.45E8 | 69.5 |
| 69 | 10.93 | 1.53E8 | 68.5 |
| 70 | 11.45 | 1.64E8 | 67.5 |
| 71 | 12. | 1.73E8 | 66.4 |
| 72 | 12.55 | 1.82E8 | 65.2 |
| 73 | 13.14 | 1.92E8 | 64.0 |
| 74 | 13.76 | 2.05E8 | 62.8 |
| 75 | 14.41 | 2.16E8 | 61.4 |
| 76 | 15. | 2.26E8 | 60.0 |
| 77 | 15.80 | 2.38E8 | 58.5 |
| 78 | 16.55 | 2.49E8 | 56.9 |
| 79 | 17.33 | 2.57E8 | 55.3 |
| 80 | 18.14 | 2.68E8 | 53.6 |
| 81 | 19. | 2.80E8 | 51.8 |
| 82 | 19.90 | 2.90E8 | 49.9 |
| 83 | 20.83 | 2.95E8 | 48.1 |
| 84 | 21.81 | 3.03E8 | 46.1 |
| 85 | 22.84 | 3.10E8 | 44.1 |
| 86 | 24. | 3.14E8 | 42.1 |
| 87 | 25.05 | 3.15E8 | 40.1 |
| 88 | 26.23 | 3.15E8 | 38.1 |
| 89 | 27.46 | 3.15E8 | 36.0 |
| 90 | 28.76 | 3.14E8 | 34.0 |
| 91 | 30. | 3.07E8 | 32.0 |
| 92 | 31.53 | 2.94E8 | 30.0 |
| 93 | 33.02 | 2.88E8 | 28.2 |
| 94 | 34.57 | 2.91E8 | 26.3 |
| 95 | 36.20 | 2.85E8 | 26.4 |
| 96 | 38. | 2.74E8 | 22.6 |
| 97 | 39.70 | 2.75E8 | 20.8 |
| 98 | 41.57 | 2.79E8 | 19.1 |
| 99 | 43.53 | 2.72E8 | 17.3 |
| 100 | 45.58 | 2.59E8 | 15.6 |
| 101 | 48. | 2.52E8 | 13.9 |
| 102 | 49.96 | 2.43E8 | 12.3 |
| 103 | 52.33 | 2.31E8 | 10.8 |
| 104 | 54.80 | 2.15E8 | 9.34 |
| 105 | 57.38 | 1.92E8 | 8.03 |
| 106 | 60. | 1.75E8 | 6.84 |
| 107 | 62.91 | 1.68E8 | 5.73 |
| 108 | 65.88 | 1.52E8 | 4.70 |
| 109 | 68.98 | 1.33E8 | 3.78 |
| 110 | 72.24 | 1.09E8 | 3.00 |
| 111 | 76. | 9.32E7 | 2.34 |
| 112 | 79.21 | 7.95E7 | 1.78 |
| 113 | 82.94 | 6.41E7 | 1.32 |
| 114 | 86.85 | 5.04E7 | 0.95 |
| 115 | 90.94 | 3.59E7 | 0.67 |
| 116 | 95. | 2.88E7 | 0.46 |
| 117 | 99.71 | 1.83E7 | 0.31 |
| 118 | 104.4 | 1.31E7 | 0.21 |
| 119 | 109.3 | 9865569 | 0.13 |
| 120 | 114.5 | 7681644 | 0.06 |
| 121 | 120. | 6392795 | 0.03 |
| 122 | 125.5 | 1575967 | 0.01 |
| 123 | 131.4 | 0 | 0.00 |

Having set forth the general nature and some specific examples of the present invention, the scope of the invention is now more specifically set forth in the appended claims.

What is claimed is:

1. A corrugating adhesive composition of the carrier or carrier-no-carrier type which in an aqueous emulsion comprises water; from about 5 to about 35 parts solubilized plant fiber per 100 parts of adhesive and, optionally, an added carbohydrate component comprised of unmodified starch and/or modified starch and/or dextrin in an amount from about 0.1 to about 99% by weight based on total added carbohydrate and solubilized fiber; a boron containing compound in an amount of from about 0.2 to about 1 part per 100 parts of adhesive; and sufficient caustic to attain a pH from about 8 to about 14 wherein the adhesive has a carrier phase and fiber has been solubilized in situ in preparing the carrier phase and residual insoluble particles having a geometric mean size of less than about 0.00005 inch and a median size of less than about 0.00005 inch are present in the composition.

2. The composition of claim 1 wherein the solubilized fiber is present in an amount from about 15 to about 25 parts per 100 parts of adhesive.

3. The composition of claim 1 wherein from about 2 to about 6 parts per 100 parts of adhesive of the solubilized fiber is in the carrier phase.

4. The composition of claim 3 having a suspended phase comprised of from about 10 to about 25 parts per 100 parts of adhesive of the added carbohydrate component.

5. The composition of claim 1 further comprising a waterproofing or water resistant resin in an amount of from about 0.5 to about 5 parts per 100 parts of adhesive.

6. A method of making a carrier phase composition for use in a carrier type or a carrier-no-carrier type corrugating adhesive composition which comprises the following sequential steps with continuous mixing:

a) admixing with water corn fiber having a surface area sufficient to allow the fiber to dissolve under relatively mild conditions and to minimize the amount of residual insoluble material and, optionally, an added carbohydrate component comprised of unmodified starch and/or modified starch and/or dextrin, in a primary mixer and heating for at least about 1 minute at a temperature of from about 46° C. to about 82° C.;

b) admixing an aqueous solution of caustic to attain a pH from about 8 to about 14 and continuing mixing; and c) admixing additional water, wherein from about 0.03 to about 1 part per 100 parts of carrier phase of a boron containing compound is admixed with the carrier phase composition and residual insoluble particles having a geometric mean size of less than about 0.00005 inch and a median size of less than about 0.00005 inch are present in the composition.

7. A method of making a carrier type corrugating adhesive composition which comprises:

a) preparing a carrier phase by the following sequential steps with continuous mixing admixing with water corn fiber having a surface area sufficient to allow the fiber to dissolve under relatively mild conditions and to minimize the amount of residual insoluble material and, optionally, an added carbohydrate component comprised of unmodified starch and/or modified starch and/or dextrin, in a primary mixer and heating for at least about 1 minute at a temperature of from about 46° C. to about 82° C.;

admixing an aqueous solution of caustic to attain a pH from about 8 to about 14 and;

admixing additional water;

b) preparing a suspended phase by the following sequential steps with continuous mixing charging a secondary mixer with water and heating the water to a temperature from about 21° C. to about 41° C.; and admixing with the heated water a carbohydrate component comprised of unmodified starch and/or modified starch and/or dextrin, and, optionally, solubilized plant fiber; and c) with continuous mixing, gradually admixing the contents of the primary mixer with the contents of the secondary mixer, wherein a boron containing compound is admixed with the carrier phase, the suspended phase or both the carrier phase and the suspended phase and the total amount of boron containing compound added is from about 0.2 to about 1 part per 100 parts of adhesive and residual insoluble particles having a geometric mean size of less than about 0.00005 inch and a median size of less than about 0.00005 inch are present in the composition.

8. A method of making corrugated board comprising joining a corrugated medium to at least one liner using a corrugating adhesive composition which in an aqueous emulsion comprises water; from about 5 to about 35 parts per 100 parts of adhesive of solubilized plant fiber and, optionally, an added carbohydrate component comprised of unmodified starch and/or modified starch and/or dextrin; sufficient caustic to attain a pH from about 8 to about 14; and from about 0.2 to about 1 part per 100 parts adhesive of a boron containing compound wherein the adhesive has a carrier phase and fiber has been solubilized in situ in preparing the carrier phase and residual insoluble particles having a geometric mean size of less than about 0.00005 inch and a median size of less than about 0.00005 inch are preent in the composition.

* * * * *